US012631059B2

(12) United States Patent
Yoon

(10) Patent No.: US 12,631,059 B2
(45) Date of Patent: May 19, 2026

(54) LOCKING DEVICE AND LOCKING SYSTEM

(71) Applicant: Southco Manufacturing and Technology (Shanghai) Co., Ltd., Shanghai (CN)

(72) Inventor: Chungsik Yoon, Gyeonggi-Do (KR)

(73) Assignee: Southco Manufacturing and Technology (Shanghai) Co., Ltd., Shanghai (CN)

( * ) Notice: Subject to any disclaimer, the term of this patent is extended or adjusted under 35 U.S.C. 154(b) by 213 days.

(21) Appl. No.: 18/473,629

(22) Filed: Sep. 25, 2023

(65) Prior Publication Data

US 2024/0060333 A1 Feb. 22, 2024

(30) Foreign Application Priority Data

Aug. 19, 2022 (CN) .......................... 202211000795.7

(51) Int. Cl.
*E05B 83/34* (2014.01)
*E05B 81/06* (2014.01)
(Continued)

(52) U.S. Cl.
CPC .............. *E05B 83/34* (2013.01); *E05B 81/06* (2013.01); *E05B 83/28* (2013.01); *B60K 2015/0561* (2013.01)

(58) Field of Classification Search
CPC .......... E05B 63/22; E05B 81/06; E05B 81/14; E05B 81/16; E05B 81/26; E05B 81/30;
(Continued)

(56) References Cited

U.S. PATENT DOCUMENTS

2015/0061314 A1 3/2015 Beck
2016/0108648 A1 4/2016 Nam
2016/0326780 A1 11/2016 Watanabe et al.

FOREIGN PATENT DOCUMENTS

CN 106150230 B 4/2018
CN 108533099 A * 9/2018 ......... G07C 9/00896
(Continued)

OTHER PUBLICATIONS

Office Action (Request for Submission of an Opinion) issued Jul. 24, 2024, by the Korean Intellectual Property Office in corresponding Korean Patent Application No. 10-2023-0107031 and an English translation of the Office Action. (20 pages).

*Primary Examiner* — Christine M Mills
*Assistant Examiner* — Peter H Watson
(74) *Attorney, Agent, or Firm* — Buchanan Ingersoll & Rooney PC

(57) ABSTRACT

The present application discloses a locking device comprising: a housing; a plunger inserted into the housing, movable and rotatable to transit between a locking position and an unlocking position, wherein when the plunger is in the unlocking position, the plunger is in a first rotating position and a first axial position, when the plunger is in the locking position, the plunger is in a second rotational position and a second axial position; a rotor accommodated in the housing and rotatable around a rotor rotation axis relative to the plunger between a engaged position and a disengaged position, wherein when the plunger is in the locking position, the rotor is rotatable to the engaged position to prevent the plunger from moving; and a motor accommodated in the housing and configured to drive the rotor to rotate. The present application further discloses a locking system.

17 Claims, 21 Drawing Sheets

(51) Int. Cl.
    *E05B 83/28*       (2014.01)
    *B60K 15/05*      (2006.01)

(58) Field of Classification Search
    CPC ...... E05B 81/34; E05B 81/36; E05B 63/0056;
           E05B 83/28; E05B 83/34; B60K 15/05;
           B60K 2015/0515; B60K 2015/053; B60K
             2015/0561; B60K 2015/0576; B60K
           2015/0584; B60K 2015/0538; E05C 5/00;
             E05C 5/02; E05C 2005/005; Y10T
             292/0863; Y10T 292/0864; Y10T
             292/0866; Y10T 292/0867; Y10T
                      292/0868
    See application file for complete search history.

(56)                   References Cited

FOREIGN PATENT DOCUMENTS

| | | | | |
|---|---|---|---|---|
| JP | 2016-079790 A | | 5/2016 | |
| JP | 2016223150 A | * | 12/2016 | |
| KR | 10-1260217 B1 | | 5/2013 | |
| KR | 10-2014-0138610 A | | 12/2014 | |
| KR | 20150063922 A | * | 6/2015 | ............ E05B 53/00 |
| KR | 10-1836755 B1 | | 3/2018 | |
| KR | 102115743 B1 | * | 5/2020 | ............ B60K 15/05 |
| WO | WO-2013050478 A2 | * | 4/2013 | ........... E05C 19/022 |

* cited by examiner

100

100

100

100

100

100

100

170

173

173

170

172

171

150

150

160

130
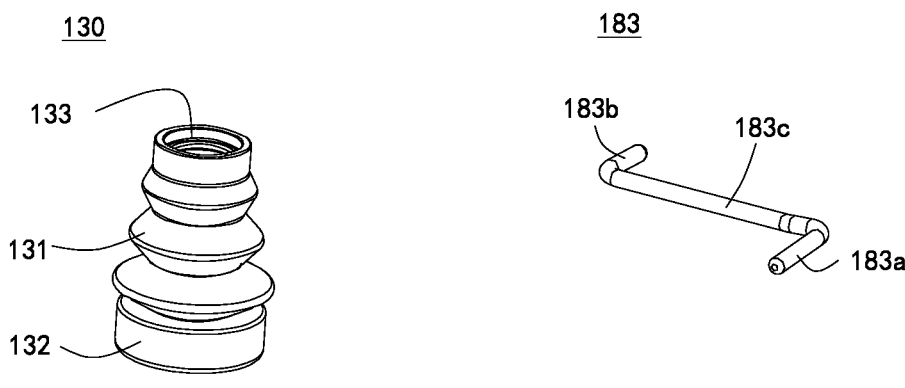
FIG. 11
183
FIG. 12
181
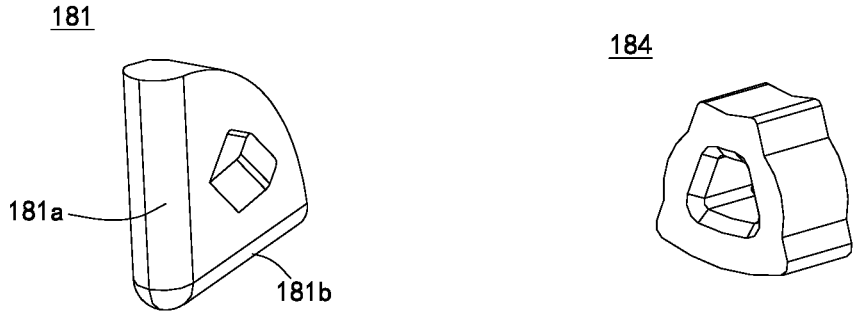
FIG. 13
184
FIG. 14

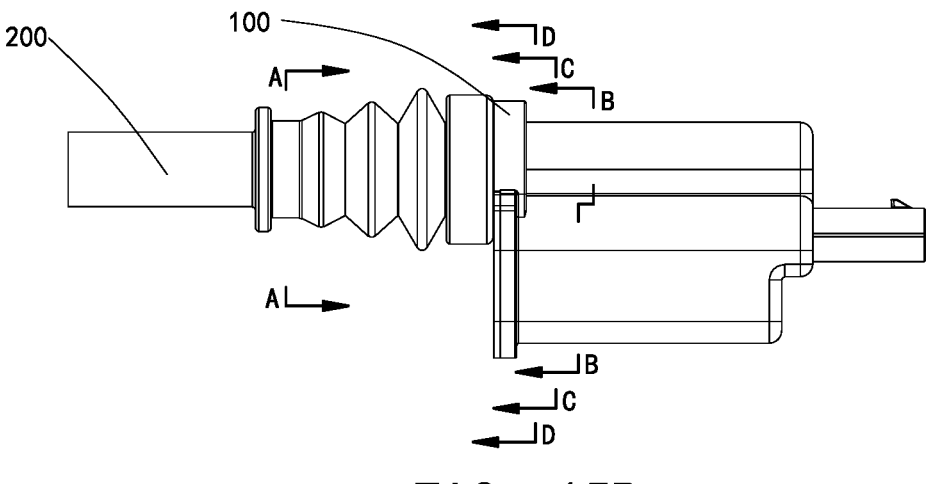
FIG. 15B
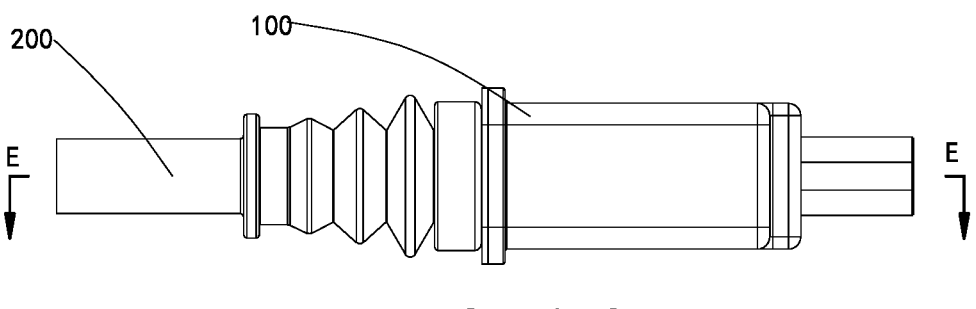
FIG. 15C
FIG. 15D

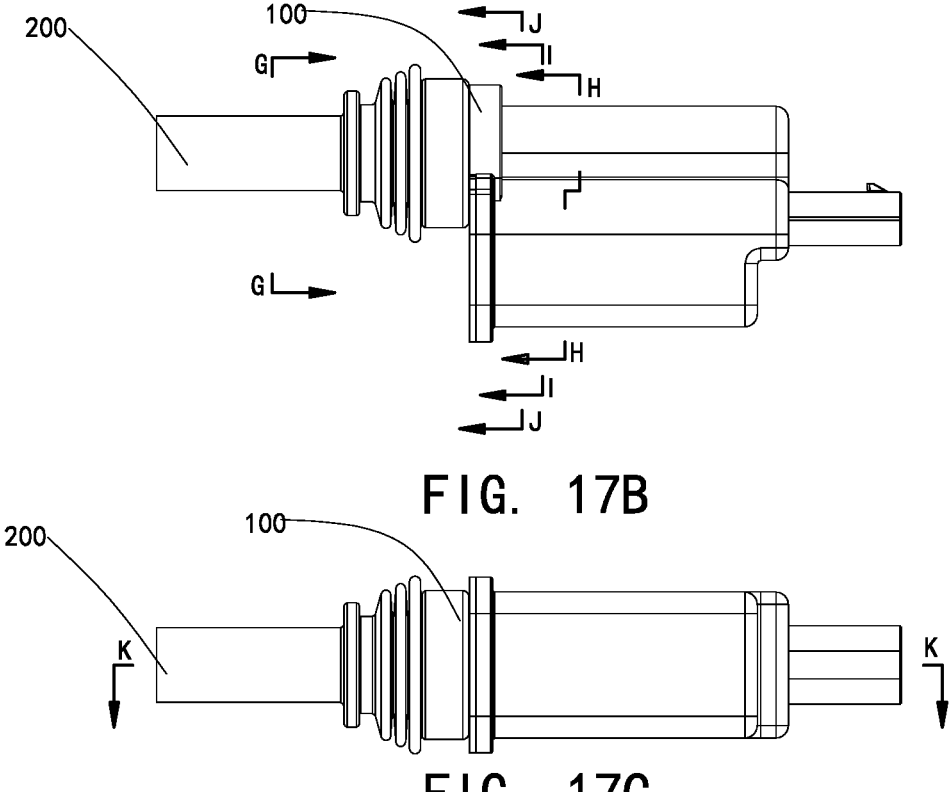
FIG. 17B
FIG. 17C
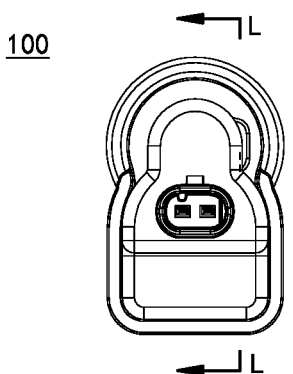
FIG. 17D

1

LOCKING DEVICE AND LOCKING SYSTEM

CROSS-REFERENCE TO RELATED APPLICATIONS

This application claims priority to Chinese Application No. 2022110007957, filed on Aug. 19, 2022, entitled "Locking Device and Locking System," which is incorporated herein by reference in its entirety for all purposes.

TECHNICAL FIELD

The present application relates to a locking device and a locking system comprising the locking device.

BACKGROUND

A locking device is common in the field of mechanical devices, and is operable for combining or separating multiple objects.

One application of the locking device is the charging door or fuel tank cap of a car. In such an application, the locking device is basically installed on the inside of the charging door or fuel tank cap to provide a clean appearance of the car. Users can unlock the charging door or fuel tank cap by pressing the locking device, and lock the charging door or fuel tank cap by pressing the locking device again, thus providing convenient operation.

In applications such as charging door or fuel tank cap, a locking device is provided in the vehicle, and an unlocking device in conjunction with the locking device is arranged on the inner side of the charging door or fuel tank cap. Therefore, it is expected that when the locking device is in the locking position, the unlocking device will be held in a state of engagement with the locking device. When the locking device is in the unlocking position, the unlocking device will detach from the locking device and can be ejected.

In other applications, the locking device is required to provide additional safety performance to avoid accidental initiate of the locking device. For example, unexpected initiate of the locking device is undesired during the travelling of the car or when the owner is away from the car.

Specifically, it is desired to integrating additional electric locking mechanisms into the locking device to minimize space occupation and provide modular advantages.

Therefore, it is necessary to propose a new locking device that can reliably achieve the above functions in a simplified structure as much as possible.

SUMMARY

The present application discloses a locking device comprising: a housing; a plunger inserted into the housing, movable in a longitudinal direction relative to the housing and rotatable around the longitudinal direction to transit between a locking position and an unlocking position, wherein when the plunger is in the unlocking position, the plunger is in a first rotating position and a first axial position, when the plunger is in the locking position, the plunger is in a second rotational position different from the first rotational position and a second axial position different from the first axial position; a rotor accommodated in the housing and rotatable around a rotor rotation axis relative to the plunger between a engaged position and a disengaged position, wherein when the plunger is in the locking position, the rotor is rotatable to the engaged position to prevent the plunger from moving; and a motor accommodated in the housing and configured to drive the rotor to rotate.

In an embodiment, the housing includes an open end and a closed end that are opposite in the longitudinal direction; the plunger comprises: a first end facing the open end; a second end opposite to the first end, the plunger being installed into the housing from the open end of the housing towards the closed end through the second end; a guide groove arranged on an outer peripheral surface of the plunger and extends along the longitudinal direction towards a middle of the plunger near the first end; wherein the locking device further includes a guide located near the open end of the housing, and the guide extends from an inner surface of the housing to abut the guide groove and move relative to the guide groove, causing the plunger to be forced to rotate to the first rotational position when the plunger moves to the first axial position, and be forced to rotate to the second rotational position when the plunger moves to the second axial position.

In an embodiment, the guide groove includes a guide groove linear segment and a guide groove spiral segment connected to each other longitudinally, the guide groove linear segment extends longitudinally in a straight line from a position close to the first end, and the guide groove spiral segment extends at an angle from the end of the guide groove linear segment, spirally away from the first end along the outer circumference of the plunger.

In an embodiment, a cross section of the guide perpendicular to the longitudinal direction matches a cross section area of the guide groove perpendicular to the longitudinal direction, and includes a first guide edge and a second guide edge, both of which are roughly perpendicular to the longitudinal direction and form an angle with each other, and are respectively against two inner sides of the guide groove spiral segment of the guide groove, to force the plunger to rotate when the plunger moves.

In an embodiment, the rotor rotation axis of the rotor is parallel to a plunger spin axis of the plunger; the guide groove further includes a guide groove engage segment, which extends basically circumferentially along a spiral direction of the guide groove spiral segment from the end of the guide groove spiral segment; the guide groove engage segment is set so that when the plunger is in the locking position and the rotor is in the engaged position, a rotor edge of the rotor is engaged with the guide groove engage segment to prevent a longitudinal movement of the plunger; and the guide groove is set to avoid mutual interaction between the plunger and the rotor when the rotor is in the disengaged position.

In an embodiment, the rotor edge of the rotor includes an actuated part with internal teeth, and a driving gear of the motor is engaged with the internal teeth to drive the rotor to rotate between the engaged position and the disengaged position; wherein the actuated part includes a engagement section and a driving section, and an extension length of the engagement section along the longitudinal direction matches a groove width of the guide groove engage segment along the longitudinal direction, so that the engagement section can rotate into the guide groove engage segment, and the driving section is connected to the engagement section, and a step is formed at the junction of the driving section and the engagement section, the step prevents the driving section from further rotating into the guide groove engage segment.

In an embodiment, the locking device further includes a housing cover installed on the open end of the housing, and a buffer is installed on an inner side of the housing cover facing the open end; the rotor is provided with two engagement portions located substantially in the same longitudinal position as the buffer, and the buffer is located between the two engagement portions, thereby controlling the rotor to swing around the rotor rotation axis.

In an embodiment, the plunger includes a trajectory groove arranged on the outer peripheral surface of the plunger, extended longitudinally towards the middle of the plunger from vicinity of the second end, staggered with the guide groove in a circumferential direction for a cooperate effect; the trajectory groove includes a trajectory groove linear segment and a trajectory groove spiral segment connected to each other in a longitudinal direction, the trajectory groove linear segment extends in a straight line in a longitudinal direction from a position close to the second end, and the trajectory groove spiral segment starts from an end of the trajectory groove linear segment, and extends an angle spirally along the outer circumference of the plunger away from the second end, and a spiral direction of the trajectory groove spiral segment is the same as the spiral direction of the guide groove spiral segment.

In an embodiment, the plunger further includes an irregular groove formed at an end of the trajectory groove spiral segment of the trajectory groove away from the second end, and defining a closed loop groove on the outer peripheral surface of the plunger; the locking device further includes an elastic needle, a fixed end of the elastic needle is fixed to the housing, a free end of the elastic needle is inserted into the trajectory groove or the irregular groove and movable along the trajectory groove and the irregular groove to limit the plunger in the locking position.

In an embodiment, the shape of the irregular groove is designed so that the free end of the elastic needle travels in a one-way cycle in the irregular groove, and does not travel in an opposite direction.

In an embodiment, a tip of the irregular groove faces the second end, and a concave portion of the irregular groove is opposite to the tip and away from the second end; when the plunger is in the unlocking position, the free end of the elastic needle is located in the trajectory groove, when the plunger is in the locking position, the free end of the elastic needle is located in the concave portion.

In an embodiment, the locking device further comprising: a compression spring, one end of which fixed to the housing, and the other end of the compression spring presses against the plunger to bias the plunger towards the first axial position.

In an embodiment, the first axial position is the position where the first end of the plunger is away from the closed end of the housing, and the second axial position is the position where the first end of the plunger is near to the closed end of the housing.

In an embodiment, the locking device further comprising: a seal in the shape of a corrugated tube, the seal is sleeved on the plunger, one end of the seal is fixed with the first end of the plunger, and another end of the seal is fixed to an flange formed jointly by a upper flange portion of the housing and a lower flange portion of the housing cover; the seal has a corrugated portion that can be extended or folded, and is extended or folded as the plunger moves between the locking position and the unlocking position.

In an embodiment, the plunger is accommodated in a first accommodating chamber of the housing, the motor and the rotor are accommodated in a second accommodating chamber of the housing, and the first accommodating chamber and the second accommodating chamber are extended along the longitudinal direction respectively and arranged in parallel in a lateral direction which is perpendicular to the longitudinal direction.

The present application further discloses a locking system, comprising: the locking device according to any one of claims 1-15; and a bolt having a bolt head, and the bolt head is longitudinally insertable or detachable from the first end of the plunger when the plunger is in the unlocking position, and locked to the first end when the plunger moves from the unlocking position to the locking position.

In an embodiment, the bolt head is in an approximately H-shaped configuration, and the first end of the plunger has a matching H-shaped inlet for bolt head to insert, and a cylindrical space for the bolt head to rotate freely is formed on the inner side of the H-shaped inlet away from the first end, so that the bolt head, after being inserted into the H-shaped inlet, through rotating at an angle along with the plunger, can be stopped by the H-shaped inlet and locked to the first end.

BRIEF DESCRIPTION OF THE DRAWINGS

The embodiments of the present application will be further described in detail with reference to the accompanying drawings hereinafter, wherein:

FIG. 11 is a perspective view of the seal of the locking device;

FIG. 12 is a perspective view of the elastic needle of the locking device;

FIG. 13 is a perspective view of the guide of the locking device;

FIG. 14 is a perspective view of the buffer of the locking device;

FIGS. 15A to 15D are the perspective view, main view, top view, and right view of the locking device with one end engaged to the bolt, wherein the locking device is in an unlocking state;

5

Figure 18A:
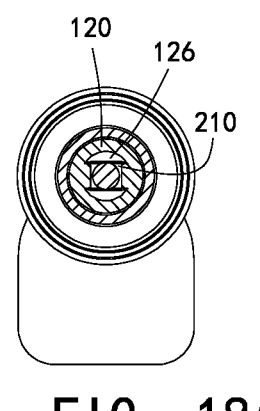
Figure 18B:
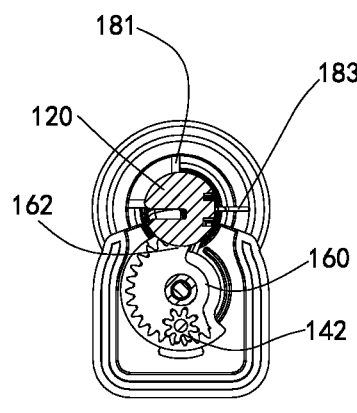
Figure 18C:
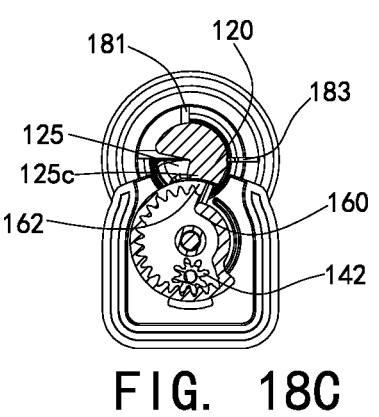
Figure 18D:
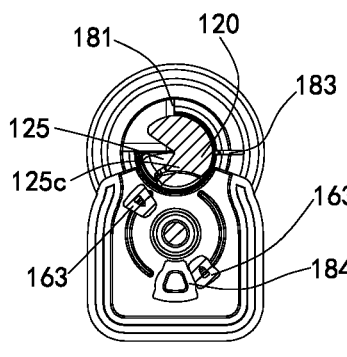
Figure 18E:
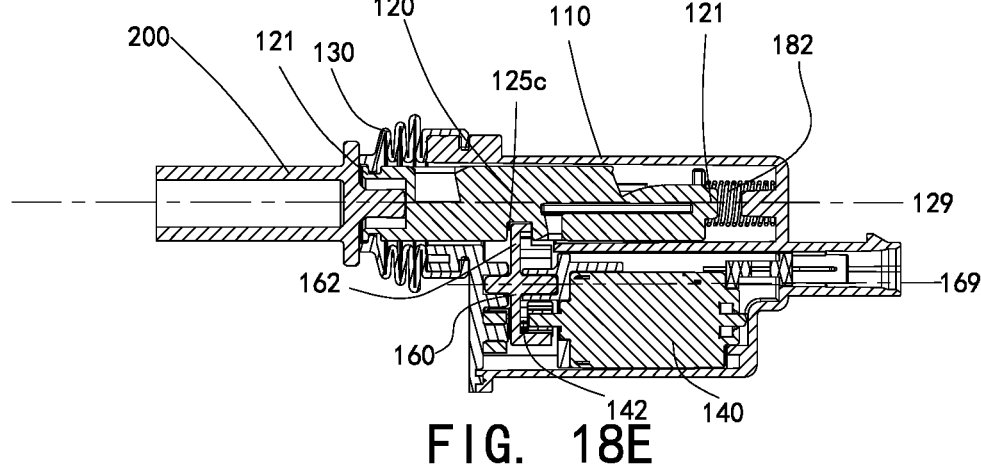
Figure 18F:
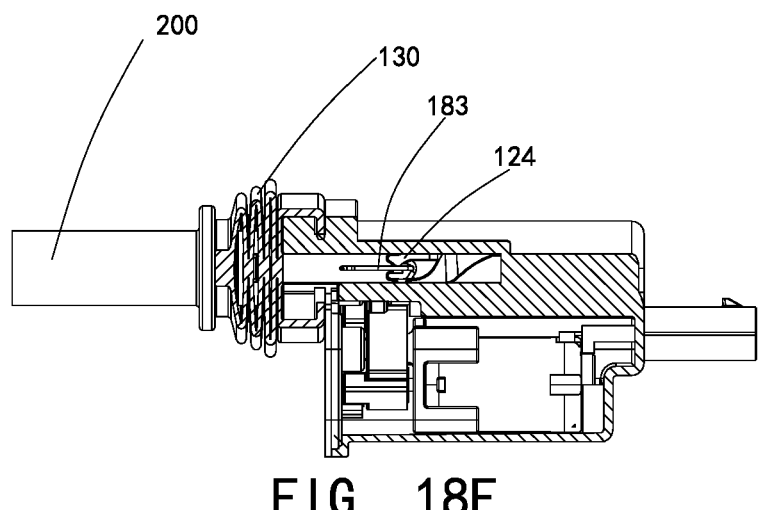
Figure 19:
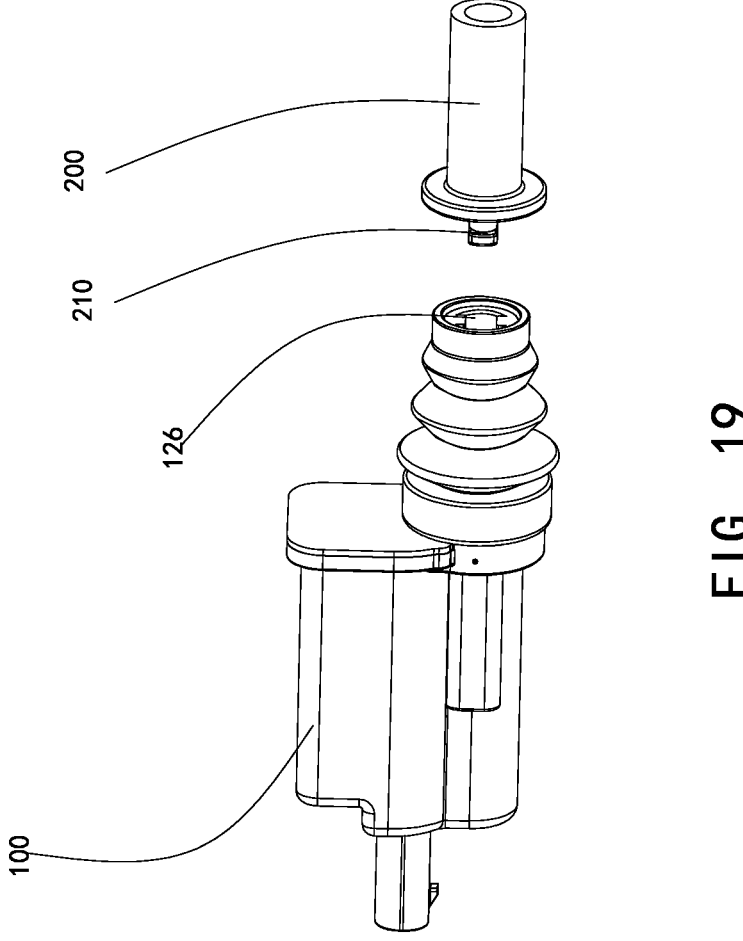
Figure 20:
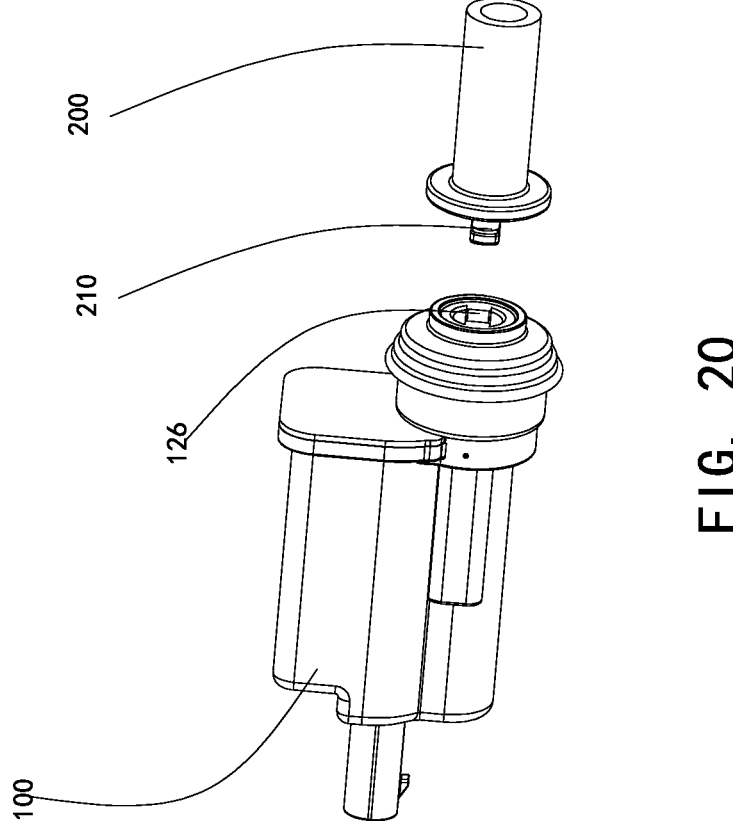

FIGS. 17A to 17D are the perspective view, main view, top view, and right view of the locking device engaged to the bolt, respectively, wherein the locking device is in a locking state;

FIGS. 18A to 18D are cross-sectional views taken along the G-G, H-H, I-I, and J-J lines in FIG. 17B, respectively;

FIGS. 18E and 18F are cross-sectional views taken along the K-K line in FIG. 17C and the L-L line in FIG. 17D, respectively;

FIG. 19 shows the state where the locking device is separated from the bolt, with the locking device in the unlocking position;

FIG. 20 shows the state where the locking device is separated from the bolt, with the locking device in the locking position.

LIST OF REFERENCE MARKS

100 Locking Device
110 Housing
   111 First Accommodating Chamber (Plunger Accommodating Chamber)
   112 Second Accommodating Chamber (Motor Accommodating Chamber)
   113 Electrical Connection Portion
      113a Accommodating Portion
   114 Upper Flange Portion
   116 Open End
   117 Closed End
   118 Installation Groove
120 Plunger
   121 First End
   122 Second End
   123 Trajectory Groove
      123a Trajectory Groove Linear Segment
      123b Trajectory Groove Spiral Segment
   124 Irregular Groove
   125 Guide Groove
      125a Guide Groove Linear Segment
      125b Guide Groove Spiral Segment
      125c Guide Groove Engage Segment
   126 Insertion Groove
   127 Locking Trajectory
   128 Unlocking Trajectory
   129 Plunger Spin Axis
130 Seal
   131 Corrugated Portion
   132 Sleeve Connecting Portion
   133 Opening
140 Motor
   141 Terminal
   142 Driving Gear
150 Motor Base
   151 Motor Installation Hole
   152 Second Rotor Installation Portion
160 Rotor
   161 Rotor Shaft
   162 Rotor Edge
      162a Engagement Section
      162b Driving Section
   163 Engagement Portion
   164 Internal Teeth
   169 Rotor Rotation Axis
170 Housing Cover
   171 Buffer Insertion Portion
   172 First Rotor Installation Portion
   173 Lower Flange Portion

6

181 Guide
   181a First Guide Edge
   181b Second Guide Edge
182 Compression Spring
183 Elastic Needle
   183a Fixed End
   183b Free End
   183c Intermediate Section
184 Buffer
185 Electrical Connection
200 Bolt
210 Bolt Head

DETAILED DESCRIPTION

Although reference is made herein to specific embodiments to illustrate and describe the present invention, it should not be limited to the details shown. Specifically, within the scope of the equivalent solution of the claims and without departing from the present invention, various modifications can be made to these details.

The descriptions of "front", "back", "up", "down" and other directions mentioned herein are only for the convenience of understanding. The present invention is not limited to these directions, but can be adjusted according to actual situations.

Figure 1D:
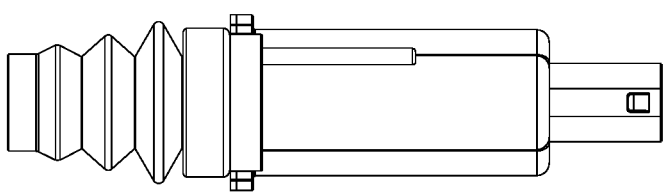
FIGS. 1A to 1E are the main view, left view, right view, top view, and bottom view of the locking device of the present application, respectively.
Figure 1A:
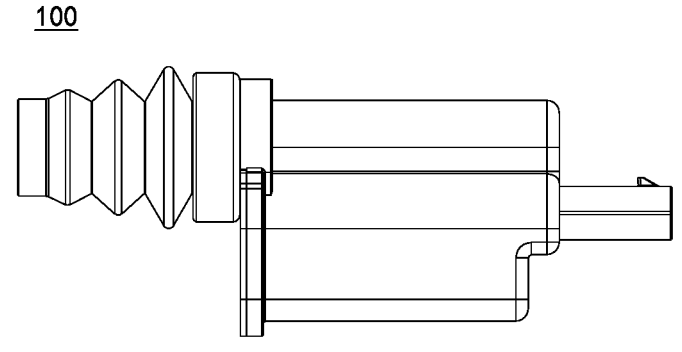
Figure 1B:
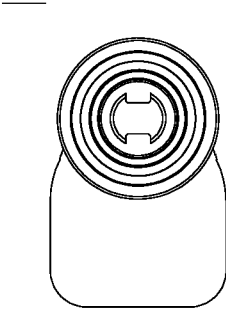
Figure 1E:
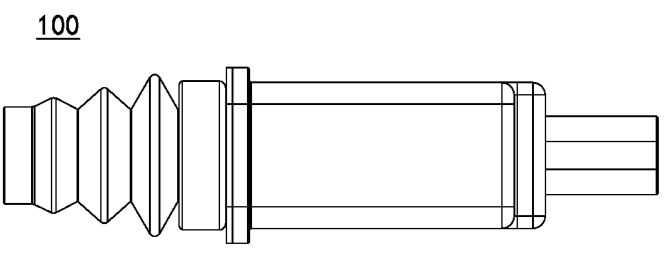
Figure 1C:
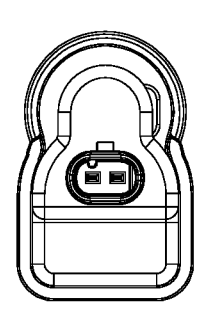
Figure 1F:
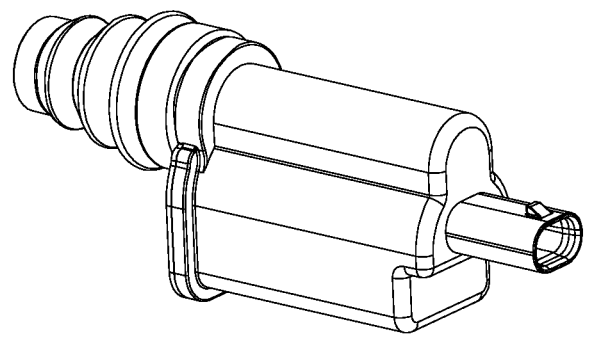
FIGS. 1F and 1G are perspective views of the locking device at different angles.
Figure 1G:
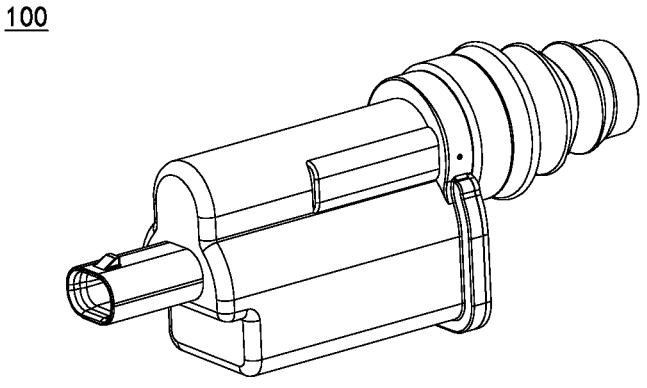
Figure 2:
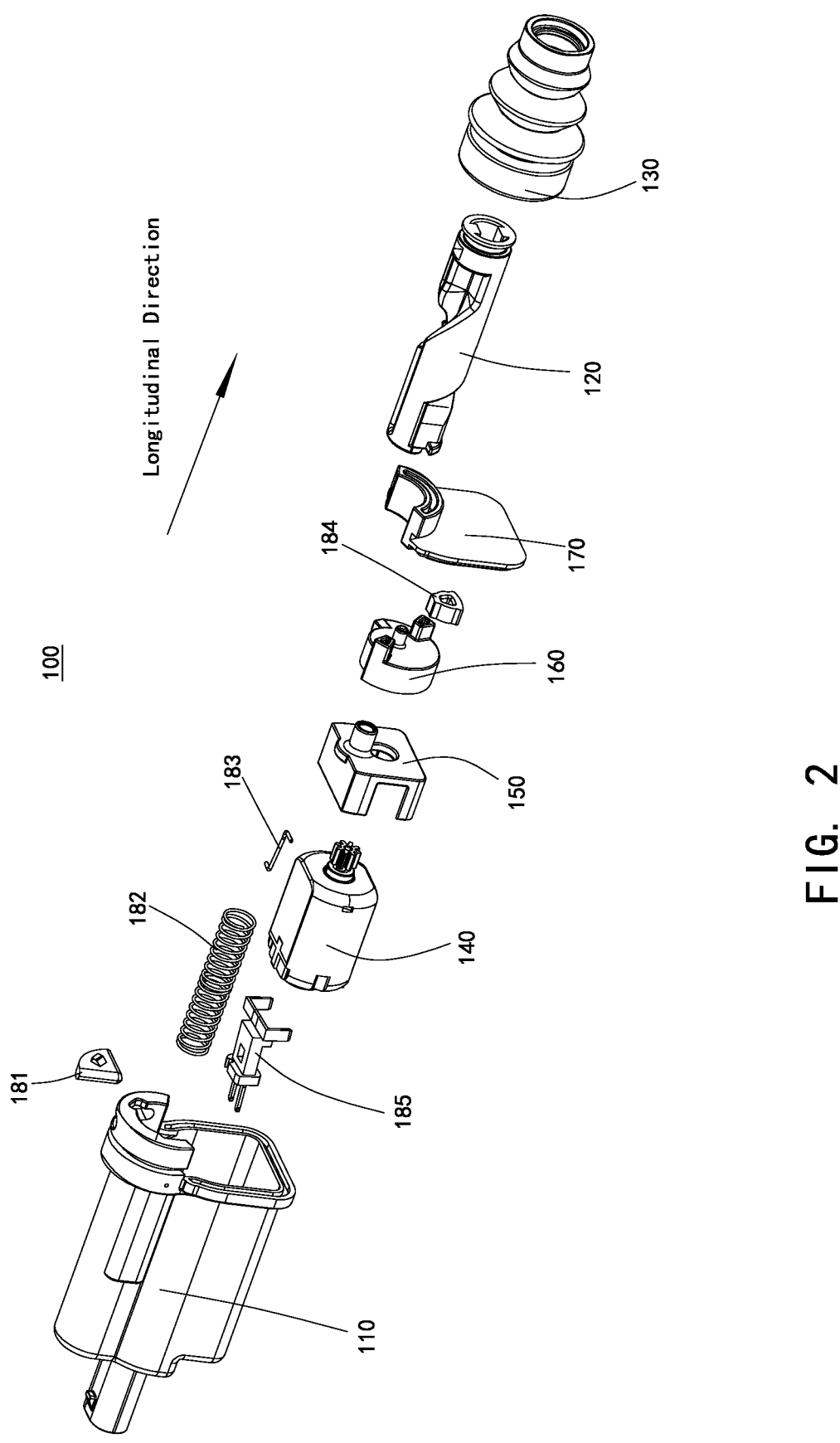
FIG. 2 is a exploded perspective view of the locking device.

Firstly, refer to FIGS. 1A to 2 for an overall description of the locking device 100 in accordance with the present application. As shown in the figures, the locking device 100 includes a housing 110, a plunger 120, a seal 130, a motor 140, a motor base 150, a rotor 160, a housing cover 170, a guide 181, a compression spring 182, an elastic needle 183, a buffer 184, and an electrical connection 185.

The plunger 120 is inserted into the housing 110, and is movable longitudinally and rotatable around a longitudinal axis relative to the housing 110 to move between the locking position (see FIGS. 17A to 18F) and the unlocking position (see FIGS. 15A to 16F). When the plunger 120 is in the unlocking position, the plunger 120 is in a first rotational position and a first axial position. When the plunger 120 is in the locking position, the plunger 120 is in a second rotational position different from the first rotational position and a second axial position different from the first axial position (as will be detailed later). That is to say, the plunger 120 simultaneously moves longitudinally and rotates around a longitudinal axis in the housing 110 to switch between the locked and unlocking positions.

The rotor 160 is accommodated in the housing 110 and is located on one side of the plunger 120. The rotor 160 can rotate between the engaged position (see FIGS. 17A to 18F) and the disengaged position (see FIGS. 15A to 16F) relative to the plunger 120. When the plunger 120 is in the locking position, the rotor 160 can rotate to the engaged position to prevent the movement of the plunger 120.

The motor 140 is accommodated in the housing 110 and can drive the rotor 160 to rotate. The guide 181 serves to limit the axial movement and rotation of the plunger 120. The compression spring 182 biases the plunger 120 towards the first axial position. The elastic needle 183 serves to hold the plunger 120 in the locking position.

Figure 3A:
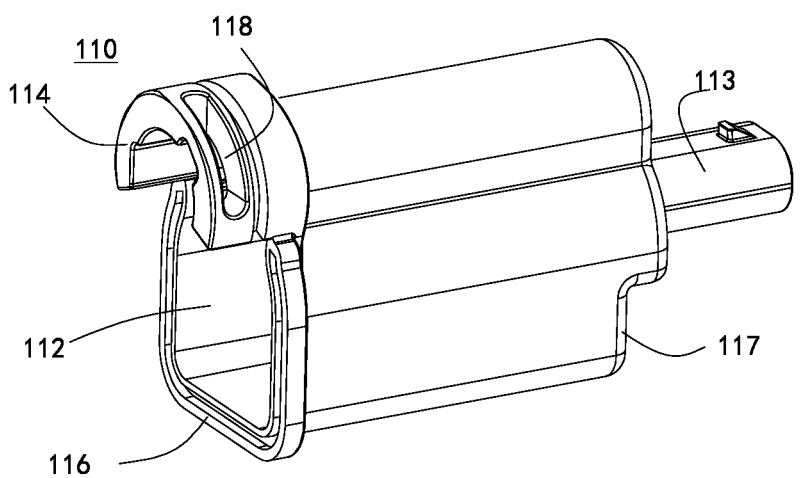
FIGS. 3A to 3C are perspective views of the housing of the locking device at different angles.
Figure 3B:
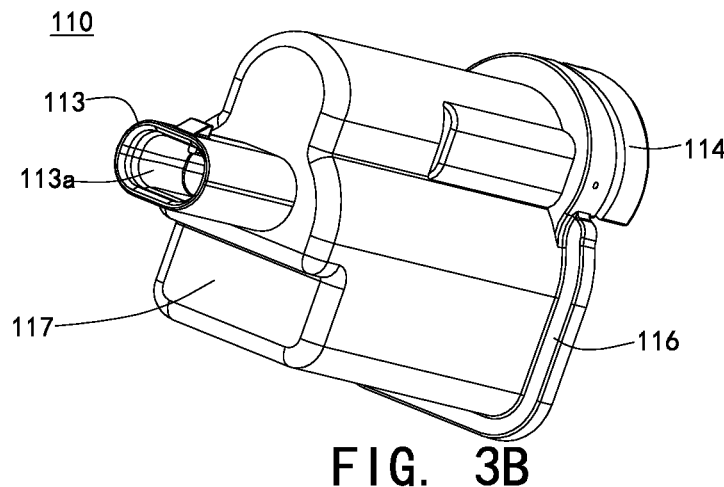
Figure 3C:
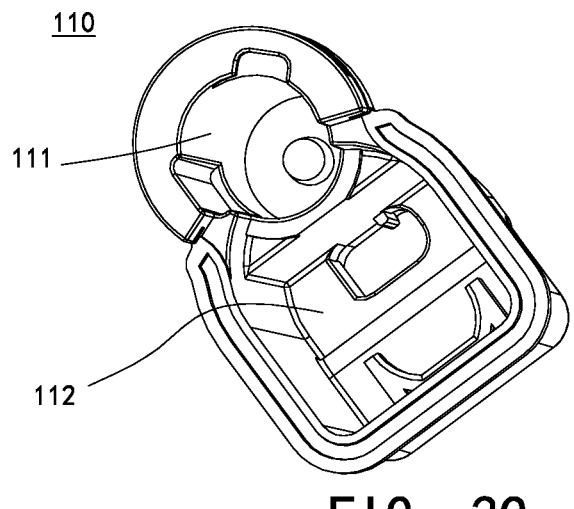

Now refer to FIGS. 3A to 3C to describe the detail structure of the housing 110. As shown in the figures, the housing 110 includes a first accommodating chamber 111 (plunger accommodating chamber), a second accommodating chamber 112 (motor accommodating chamber), an electrical connection portion 113, an accommodating portion 113*a*, an upper flange portion 114, an open end 116, and a closed end 117.

The open end 116 is longitudinally opposite to the closed end 117, and the closed end 117 can be closed. The electrical connection portion 113 extends longitudinally outward from the closed end 117. The electrical connection portion 113 is equipped with a longitudinal accommodating portion 113*a*, so that the electrical connector 185 in the housing 110 forms an electrical connection with the vehicle through the accommodating portion 113*a*. For example, the electrical connector 185 can be injection molded into the accommodating portion 113*a*. The housing 110 has the first accommodating chamber 111 and the second accommodating chamber 112, both of which extend longitudinally throughout the entire length of the housing 110 and are parallel in a lateral direction which is perpendicular to the longitudinal direction. In the embodiment shown in the figures, the first accommodating chamber 111 is located above the second accommodating chamber 112.

An upper flange portion 114 is provided at one end of the open end 116 of the first accommodating chamber 111. The upper flange portion 114 extends axially beyond the first and second accommodating chambers 111 and 112, and has an annular shape around the longitudinal direction. The annular diameter is larger than that of the first accommodating chamber 111, and the upper flange portion 114 is provided with an opening 133 in the direction towards the second accommodating chamber 112. An installation groove 118 is provided on the annular wall of the upper flange portion 114 to fix the guide 181 to the housing 110.

Figures 4A, 4B:
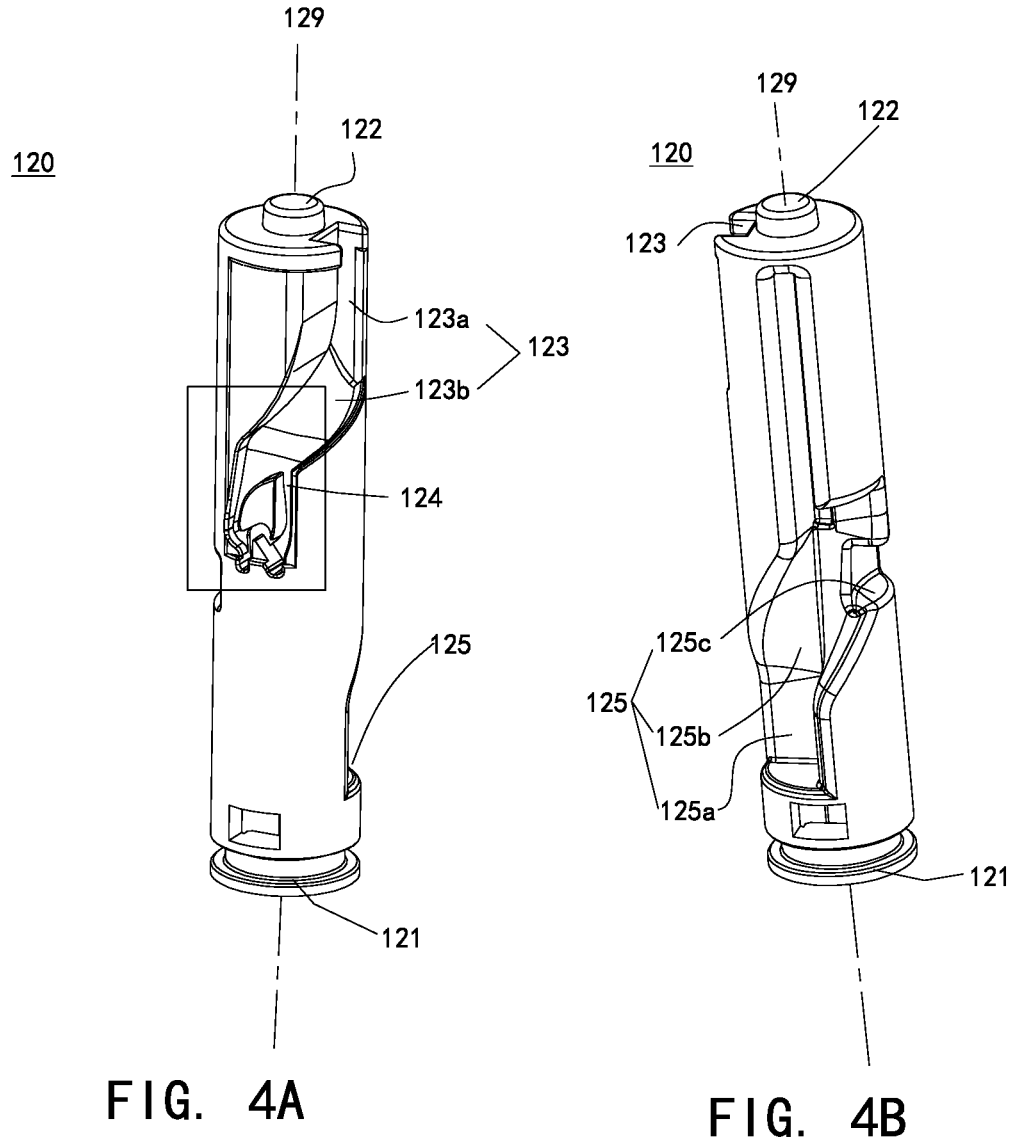
FIGS. 4A to 4C are perspective views of the plunger of the locking device at different angles.
Figures 4C, 5:
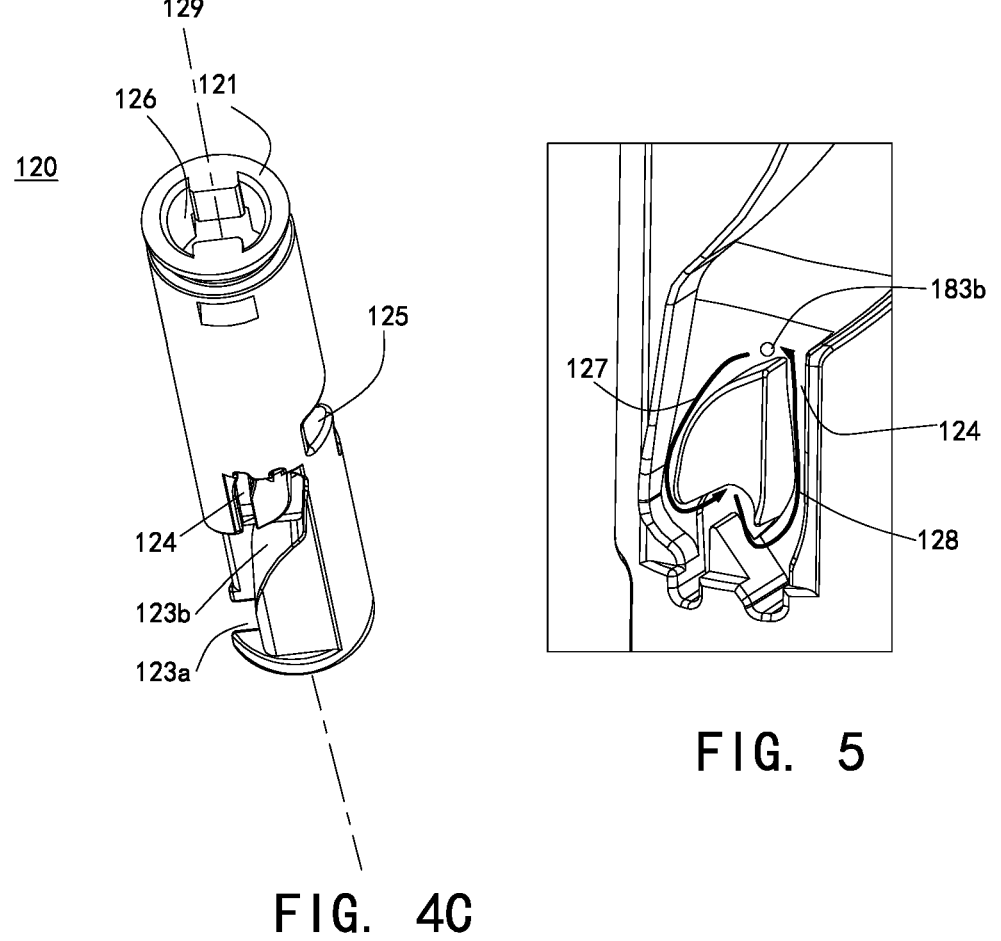
FIG. 5 is a partially enlarged view of the box portion of FIG. 4A.

Now refer to FIGS. 4A to 5 to describe the specific structure of the plunger 120. As shown in the figures, the plunger 120 includes a first end 121, a second end 122, and is provided with a trajectory groove 123, an irregular groove 124, a guide groove 125, and an insertion groove 126.

In the assembled state, the first end 121 of the plunger 120 faces towards the open end 116 of the housing 110, and the second end 122 of the plunger 120 faces towards the closed end 117 of the housing 110. The plunger 120 is installed into the housing 110 through the second end 122 from the open end 116 of the housing 110 towards the closed end 117, and the second end 122 is located opposite the first end 121 and away from the closed end 117.

The guide groove 125 is designed to interact with the guide 181 to limit the axial movement and rotation of the plunger 120. Specifically, some sections of the guide groove 125 (such as the guide groove linear segment 125*a* and the guide groove spiral segment 125*b*) interact with the guide 181, while another section of the guide groove 125 (such as the guide groove engage segment 125*c*) interacts with the rotor 160. The guide 181 is fixed inside the housing 110 and inserted into the guide groove 125. As a result when the plunger 120 moves axially, the guide 181 forces the plunger 120 to rotate. For example, when the plunger 120 moves from the first axial position to the second axial position, the guide 181 forces the plunger 120 to rotate from the first rotational position to the second rotational position. On the contrary, when the plunger 120 moves from the second axial position to the first axial position, the guide 181 forces the plunger 120 to rotate back from the second rotational position to the first rotational position. In this way, only the plunger 120 needs to be driven axially, and the plunger 120 will automatically rotate under the action of the guide 181.

Particularly, the guide groove 125 is arranged on the outer peripheral surface of the plunger 120 and extends longitudinally towards the middle of the plunger 120 from near the first end 121. More specifically, the guide groove 125 includes a guide groove linear segment 125*a* and a guide groove spiral segment 125*b* that are connected to each other longitudinally. The guide groove linear segment 125*a* extends longitudinally in a straight line from a position near the first end 121, and the guide groove spiral segment 125*b* extends at an angle, such as 90 degrees, from the end of the guide groove linear segment 125*a*, spirally away from the first end 121 along the outer circumference of the plunger 120.

The guide groove 125 further fits with the rotor 160 to engage with the plunger 120 in the locking position (the second axial position and the second rotational position). For this purpose, the guide groove 125 further includes a guide groove engagement section 125*c*, which extends basically circumferentially along the spiral direction of the guide groove spiral section 125*b* from the end of the guide groove spiral section 125*b*. The rotor 160 can be driven and engaged into the guide groove engagement section 125*c*, thereby preventing the movement of the plunger 120. More specifically, the rotor 160 can be set to prevent the movement and/or rotation of the plunger 120, and any setting method can achieve the purpose of the present application.

The trajectory groove 123 is arranged on the outer peripheral surface of the plunger 120, extending longitudinally towards the middle of the plunger 120 from near the second end 122, and is staggered and synergistically arranged with the guide groove 125 in the circumferential direction. The trajectory groove 123 serves to accommodate the free end 183*b* of the elastic needle 183, so that the plunger 120 does not interfere with the elastic needle 183 during rotation. The trajectory groove 123 includes a trajectory groove linear segment 123*a* and a trajectory groove spiral segment 123*b* that are connected to each other in the longitudinal direction. The trajectory groove linear segment 123*a* extends in a straight line in the longitudinal direction from a position close to the second end 122. The trajectory groove spiral segment 123*b* extends at an angle, from the end of the trajectory groove linear segment 123*a*, spirally away from the second end 122 along the outer circumference of the plunger 120. The spiral direction of the trajectory groove spiral segment 123*b* is the same as that of the guide groove spiral segment 125*b*.

The irregular groove 124 is formed at the end of the trajectory groove spiral segment 123*b* of the trajectory groove 123 away from the second end 122, and defines a special shaped closed loop groove on the outer peripheral surface of the plunger 120. The locking device 100 further includes an elastic needle 183, one end (fixed end 183*a*) of the elastic needle 183 is fixed to the housing 110, and the other end (free end 183*b*) of the elastic needle 183 is inserted into the irregular groove 124 and can move along the trajectory groove 123 and the irregular groove 124 to limit the plunger 120 in the locking position.

It should be understood that the elastic needle 183 basically does not rotate or move longitudinally with the plunger 120, so that only when the plunger 120 rotates to the second rotation position, the irregular groove 124 will rotate to the direction facing the elastic needle 183, causing the elastic needle 183 to slide from the trajectory groove 123 into the irregular groove 124.

The shape of the irregular groove 124 is designed so that the free end 183*b* of the elastic needle 183 can only move in a one-way cyclic in the irregular groove 124, but cannot move in the opposite direction. The tip of the irregular groove 124 towards the second end 122, while the concave portion of the irregular groove 124 is opposite to the tip and away from the second end 122. When the plunger 120 is in the unlocking position, the free end 183*b* of the elastic needle 183 is located in the trajectory groove 123. When the plunger 120 is in the locking position, the free end 183*b* of the elastic needle 183 is located in the concave portion.

FIG. 5 schematically shows the motion trajectory of the free end 183*b* of the elastic needle 183 in the irregular groove 124. When the plunger 120 moves towards the locking position, the free end 183*b* moves along the locking trajectory 127, that is, the free end 183*b* slides from the trajectory groove 123 through the tip along the outer contour of the irregular groove 124 towards the lower part in FIG. 5 relative to the irregular groove 124, and rests in the concave portion when the plunger 120 rebounds towards the first axial position (i.e., the upper part in FIG. 5), thereby holds the plunger 120 in the locking position. When the plunger 120 moves towards the unlocking position again, the free end 183*b* moves along the unlocking trajectory 128, that is, the free end 183*b* moves along the outer contour of the irregular groove 124 to leave the concave portion, and returns to the trajectory groove 123 through the tip when the plunger 120 rebounds towards the first axial position, allowing the plunger 120 to return to the unlocking position. In the present application, the shape of the irregular groove 124 is roughly heart-shaped, but in other embodiments, the irregular groove 124 can also take on different shapes, as long as it can guide the one-way cyclic movement of the free end 183*b* and can engage the free end 183*b* in the locking position.

The bottom surface of the irregular groove 124 can be equipped with several step or ratchet portion to prevent the free end 183*b* from retrograde along the opposite direction of the locking trajectory 127 and unlocking trajectory 128. The step or ratchet portion, for example, forms a height difference along the radial direction of the plunger 120 in the irregular groove 124, so that the free end 183*b* moves in one-way cyclic along the locking trajectory 127 and unlocking trajectory 128 shown in FIG. 5 and cannot move in the opposite direction.

It should be understood that the fit between the irregular groove 124 and the elastic needle 183 has the function of keeping the plunger 120 in the locking position. However, in applications such as automobiles, external impacts or vibrations may cause the free end 183*b* of the elastic needle 183 to accidentally leave the concave portion. As a result, the plunger 120 is no longer held in the locking position and the locking device 100 unexpectedly unlocks. On the other hand, during the parking period of a car, it is also expected to keep the charging door or fuel tank door locked, that is, to lock the safety lock of the plunger 120.

The function of the rotor 160 is to prevent accidental unlocking of the locking device 100. When the plunger 120 moves to the locking position, the rotor 160 engage in the guide groove engage segment 125*c*. In this way, even if subjected to external impacts or vibrations, the plunger 120 will not easily leave the locking position.

Figure 6A:
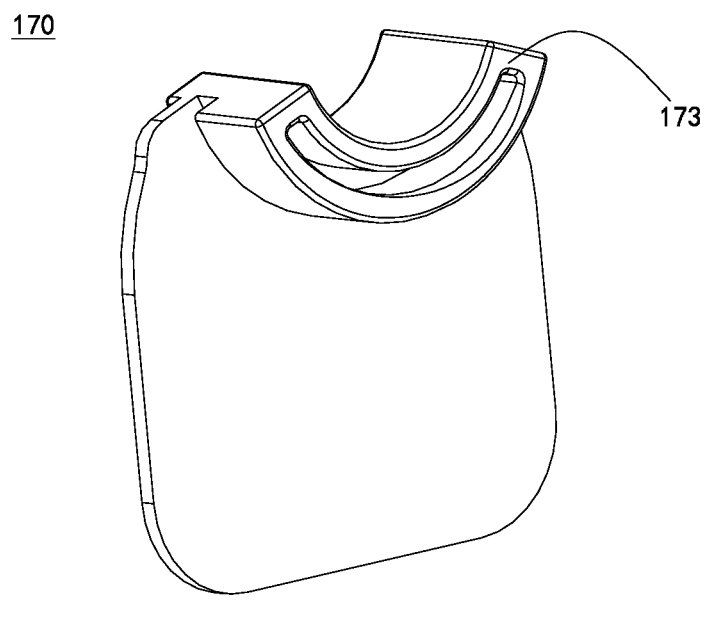
FIGS. 6A and 6B are perspective views of the housing cover of the locking device at different angles.
Figure 6B:
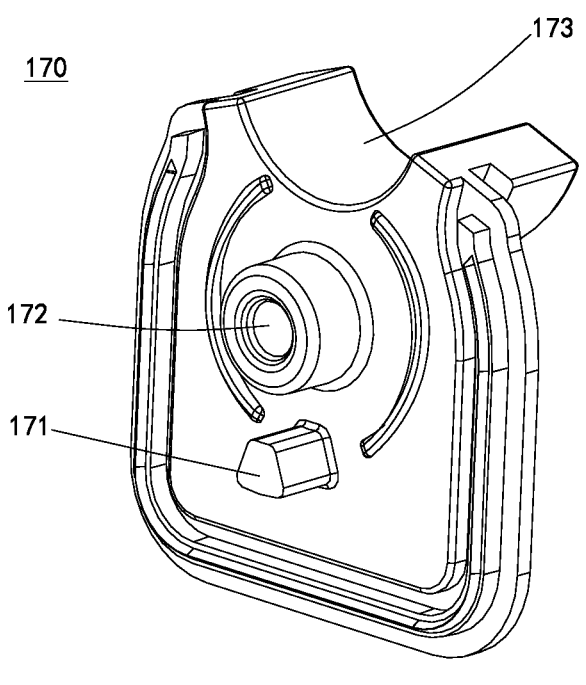

Now refer to FIGS. 6A to 6B to describe the specific structure of the housing cover 170. The housing cover 170 is roughly plate-shaped and includes a buffer insertion portion 171, a rotor 160 installation portion, and a lower flange portion 173. Referring to FIG. 2, it can be seen that the housing cover 170 is engaged at the open end 116 of the housing 110, forming a closed accommodation space with the housing 110.

The buffer insertion part 171 is located on the inner side of the housing cover 170 and protrudes towards the inside of the housing 110. The first rotor installation portion 172 is located at the inner center of the housing cover 170 and forms a hollow column protruding towards the inner part of the housing 110. The buffer insertion portion 171 has a roughly trapezoidal cross-section, so that the buffer 184 can be inserted and fixed to it. It should be understood that the buffer insertion portion 171 can also have a cross-section of other shapes, as long as the buffer 184 can be fixed and inserted. The buffer 184 serves to against the engagement portion 163 to limit the rotation range of the rotor 160, and the buffer 184 is made of flexible material to reduce collision noise. The lower flange portion 173 is located at the upper end of the housing cover 170 and protrudes towards the outside of the housing 110 to secure the seal 130. The lower flange portion 173 and the upper flange portion 114 form a flange with a complete circumference, and the seal 130 is sleeved on the flange.

Figure 7A:
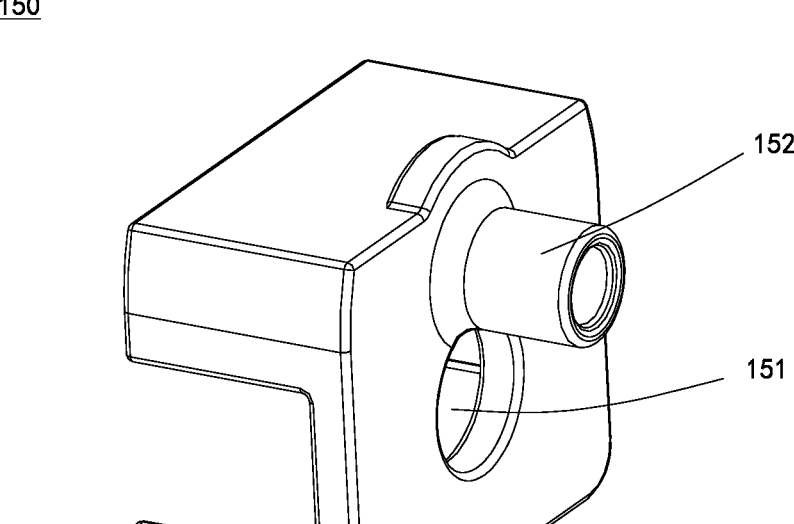
FIGS. 7A and 7B are perspective views of the motor base of the locking device at different angles.
Figure 7B:
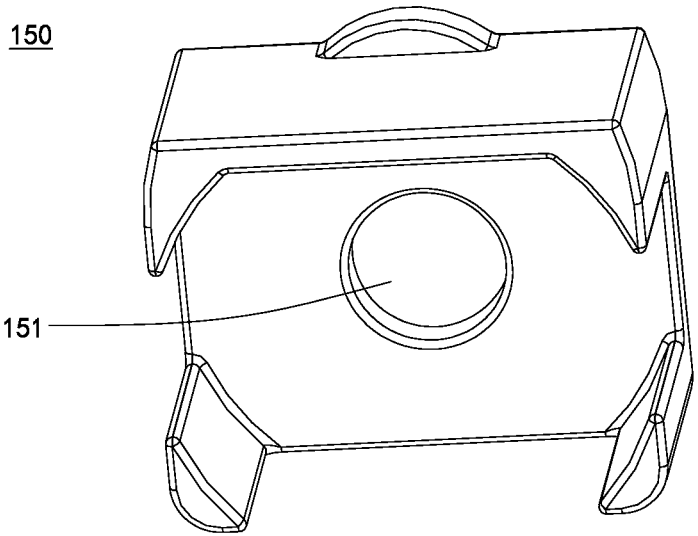

Now refer to FIGS. 7A to 7B to describe the specific structure of the motor base 150. The motor base 150 is roughly in the shape of a plate with side walls, and includes a motor installation hole 151 and a second rotor installation portion 152. Referring to FIG. 2, it can be seen that the motor base 150 is fixed in the second accommodating chamber 112 inside the housing 110, used to fix the motor 140 and the rotor 160.

The motor installation hole 151 is arranged on the center of the motor base 150, used to erect the motor 140 and allow the driving gear (FIG. 8) connected to the motor 140 to pass through the motor base 150. The second rotor installation portion 152 is in a hollow column shape and opposite to the first rotor installation portion 172. The two ends of the rotor shaft 161 (FIGS. 10A and 10B) are respectively engaged to the second rotor installation portion 152 and the first rotor installation portion 172 which forms a hollow column shape.

Figure 8:
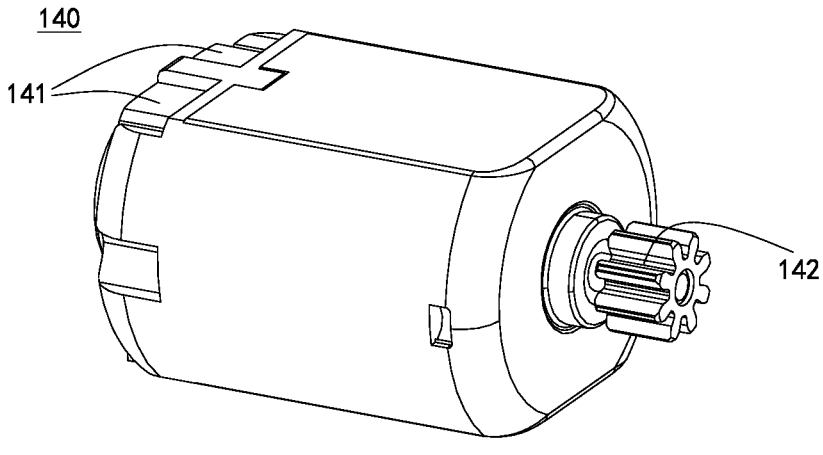
FIG. 8 is a perspective view of the motor of the locking device.

Now refer to FIG. 8 to describe the specific structure of motor 140. The motor 140 has a terminal 141 and a driving gear. Referring to FIG. 2, the motor 140 is arranged in the second accommodating chamber 112, and the rotation shaft of the motor 140 extends longitudinally. The terminal 141 and driving gear are respectively located at the longitudinal ends of motor 140. The terminal 141 faces the closed end 117 of the housing 110, and the driving gear faces the open end 116 of the housing 110. The driving gear of the motor 140 meshes with the driving section 162*b* of the rotor 160 (FIG. 10B), enabling the motor 140 to drive the rotation of the rotor 160.

Figure 9:
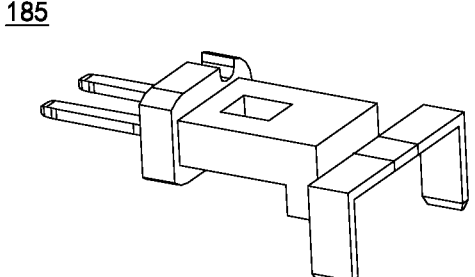
FIG. 9 is a perspective view of the electrical connector of the locking device.

FIG. 9 shows the specific structure of the electrical connection 185. The electrical connection 185 is arranged near the closed end 117 of the housing 110 to connect the external power supply of the locking device 100 to the motor 140. The shape of the electrical connection 185 can be adjusted according to the actual situation, not limited to the shape shown in the figure.

Figure 10A:
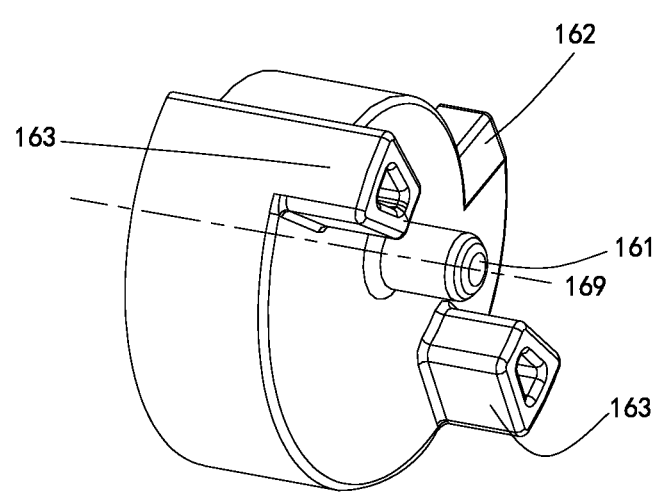
FIGS. 10A and 10B are perspective views of the rotor of the locking device at different angles.
Figure 10B:
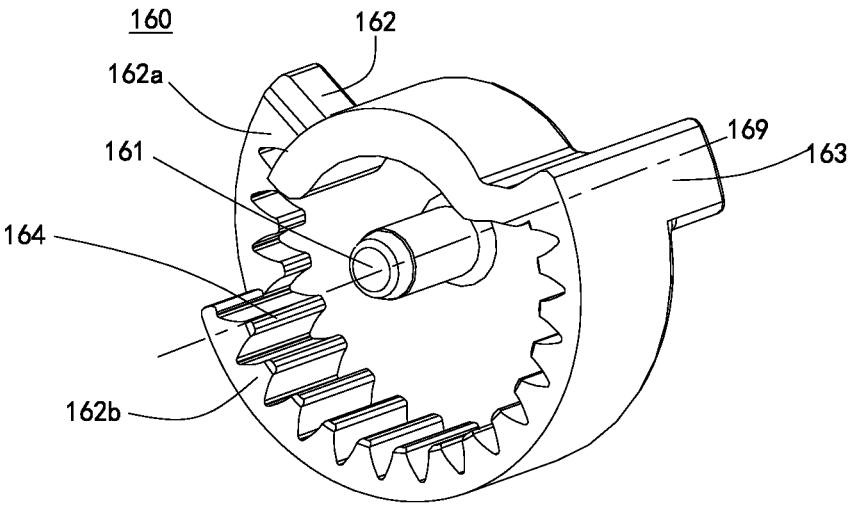
Figure 15A:
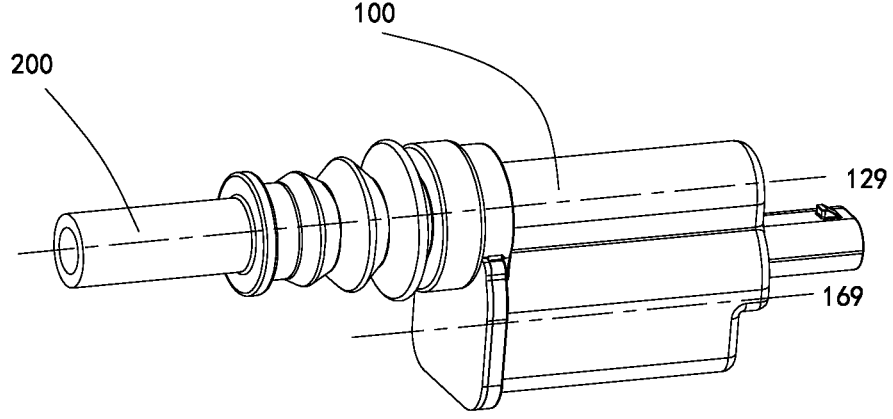

Now refer to FIGS. 10A and 10B to describe the specific structure of the rotor 160. The rotor 160 is roughly fan-shaped, and the rotor rotation axis 169 is parallel to the plunger spin axis 129 of the plunger 120. The rotor 160 includes a rotor shaft 161, a rotor edge 162, a engagement section 162*a*, a driving section 162*b*, two engagement portion 163, and internal teeth 164.

The fan-shaped surface of the rotor 160 is perpendicular to the rotor rotational axis 169, and the rotor shaft 161 passes through the fan-shaped surface of the rotor 160. The two ends of the rotor shaft 161 are respectively engaged to the first rotor installation portion 172 and the second rotor installation portion 152.

The engagement portions 163 protrude towards the installation section and is located at the outer peripheral edge of the rotor 160 and spaced circumferentially. The engagement portion 163 and the buffer 184 are located in essentially the same longitudinal position, and the buffer 184 is located between the two engagement portions 163, thereby controlling the rotor 160 to swing around the rotor rotating axis 169. When the rotor 160 rotates, the engagement portion 163 against the buffer 184 to limit the rotation range of the rotor 160.

The driving section 162*b* is located at the outer peripheral edge of the rotor 160 and extends towards the closed end 117, and the radial inner side of the driving section 162*b* is formed with internal teeth 164 to mesh with the driving gear.

The rotor edge 162 protrudes radially. When the plunger 120 is in the locking position and the rotor 160 is in the engaged position, the rotor edge 162 is engaged in the guide groove engage segment 125*c* to prevent the longitudinal movement of the plunger 120. The rotor edge 162 can also include an actuated part with internal teeth 164, and the driving gear of the motor 140 meshes with the internal teeth 164 to drive the rotor 160 to rotate between the engaged and disengaged positions.

FIG. 11 shows the specific structure of the seal 130. The seal 130 is in the shape of a corrugated tube, and is sleeved on the plunger 120. One end of the seal 130 (i.e., the opening 133) is fixed to the first end 121 of the plunger 120, and the other end of the seal 130 (i.e., the sleeve connecting portion 132) is fixed to the flange formed by the upper flange portion 114 of the housing 110 and the lower flange portion 173 of the housing cover 170, to seal the flange.

The seal 130 has a corrugated portion 131 that can be extended or folded, and can be extended or folded as the plunger 120 moves between the locking and unlocking positions.

FIG. 12 shows the specific structure of the elastic needle 183. The elastic needle 183 is roughly Z-shaped and has a fixed end 183*a*, a free end 183*b*, and an intermediate section 183*c* connected between the fixed end 183*a* and the free end 183*b*.

The fixed end 183*a* is fixed to the interior of the housing 110, and the free end 183*b* is inserted into the irregular groove 124 and can swing laterally and elastically to slide along the trajectory of the irregular groove 124. Therefore, when the plunger 120 moves relative to the housing 110, the free end 183*b* moves along the irregular groove 124.

FIG. 13 shows the specific structure of the guide 181. The guide 181 is roughly fan-shaped and includes a first guide edge 181*a* and a second guide edge 181*b*.

The guide 181 is located near the open end 116 of the housing 110 and extends from the inner surface of the housing 110 to against and move relative to the guide groove 125, such that the plunger 120 to be forced to rotate to the first rotational position when moving to the first axial position, and forced to rotate to the second rotational position when moving to the second axial position.

The cross section of the guide 181 perpendicular to the longitudinal direction matches the cross section of the guide groove 125 perpendicular to the longitudinal direction. The first guide edge 181*a* and the second guide edge 181*b* are both roughly perpendicular to the longitudinal direction, forming an angle with each other, and are respectively against the two inner sides of the guide groove spiral segment 125*b* of the guide groove 125 to force the plunger 120 to rotate when the plunger 120 moves. In the present embodiment, the first guide edge 181*a* and the second guide edge 181*b* are perpendicular to each other, but this is not necessary, and the both may form another angle.

FIG. 14 shows the specific structure of the buffer 184. The buffer 184 is roughly trapezoidal in shape and has a trapezoidal accommodating portion 113*a* for sleeve to the buffer insertion portion 171 of the housing cover 170.

Now describe the operation of the locking device 100 and the bolt 200 of the present application.

As shown in FIGS. 15A to 16F, the locking device 100 is now in the released position. At this point, the plunger 120 is in the first axial position and the first rotational position.

Figure 16A:
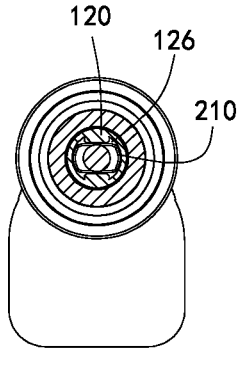
FIGS. 16A to 16D are cross-sectional views taken along the A-A, B-B, C-C, and D-D lines in FIG. 15B, respectively.
Figure 16B:
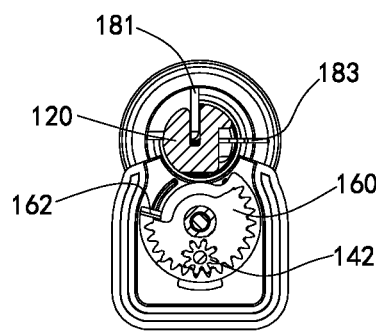
Figure 16C:
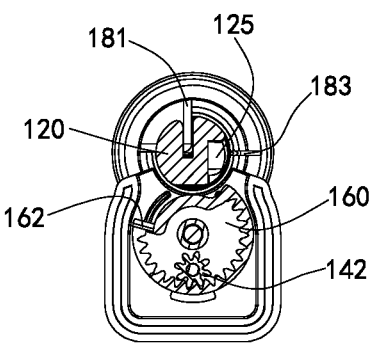
Figure 16D:
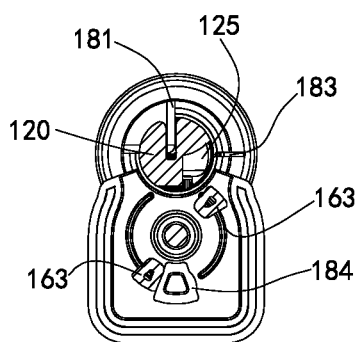
Figure 16E:
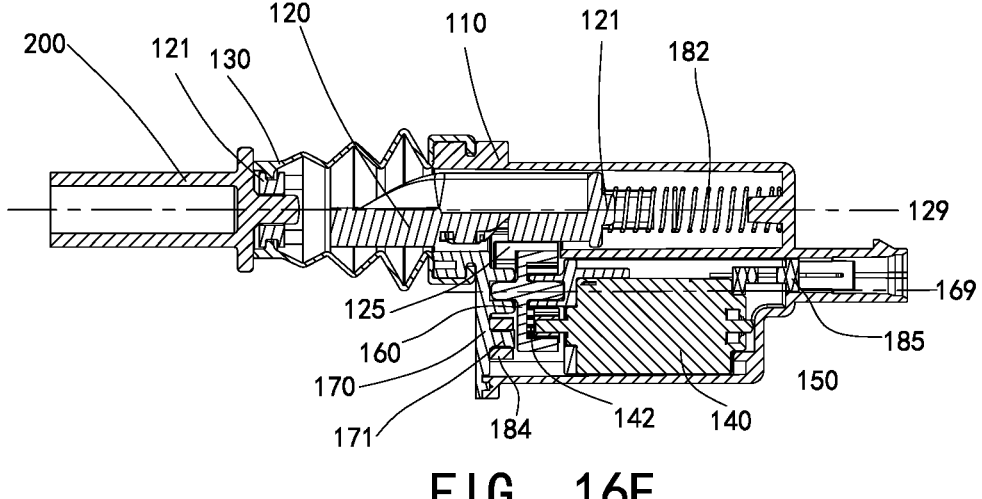
FIGS. 16E and 16F are cross-sectional views taken along the E-E line in FIG. 15C and the F-F line in FIG. 15D, respectively.

As shown in FIG. 16E, the first axial position is the position where the first end 121 of the plunger 120 is away from the closed end 117 of the housing 110. At this point, the first end 121 of the plunger 120 extends to the outside of the locking device 100, which can lift devices such as charging doors or fuel tank caps (not shown). The compression spring 182 biases the plunger 120 towards the first axial position, such that the plunger 120 tends to remain in the first axial position in the situation that no external force is applied.

As shown in FIG. 16A, the first rotational position is the position where the insertion groove 126 of the plunger 120 is aligned with the bolt head 210 of the bolt 200. The bolt 200 is engaged on the inside of a device such as a charging door or fuel tank cap, and does not rotate itself. Therefore, when the plunger 120 is in the first rotating position, the bolt 200 can be inserted into the slot 126 of the plunger 120, allowing the bolt 200 to enter and exit the plunger 120, in order to open or close the charging door or fuel tank cap.

As shown in FIGS. 16B and 16C, when the plunger 120 is in the first rotational position, the guide groove 125 is not facing the rotor 160, so that the rotor 160 cannot rotate to the position where it is engaged with the guide groove 125.

As shown in FIGS. 16B to 16D, at this time, the rotor 160 is in a disengaged position, meaning no interaction exists between the rotor 160 and the plunger 120, especially the rotor edge 162 is not rotated into the guide groove 125 of the plunger 120. The buffer 184 is against one of the engagement portions 163 to prevent excessive rotation of the rotor 160.

Figure 16F:
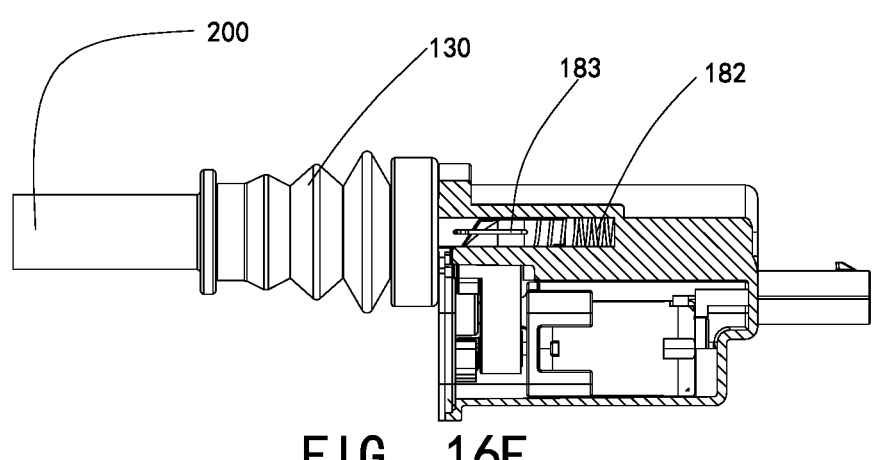
Figure 17A:
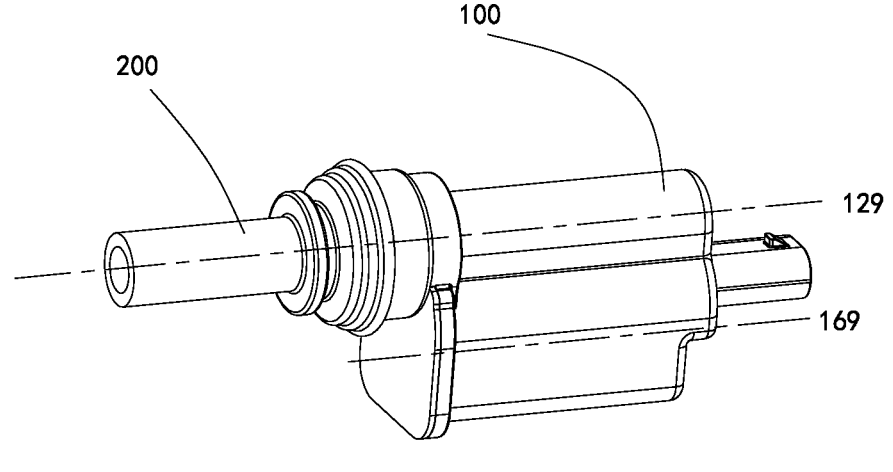

As shown in FIG. 16F, when the plunger 120 is in the unlocking position, the elastic needle 183 does not move into the irregular groove 124 (at this time, the free end 183*b* of the elastic needle 183 is in the trajectory groove 123), so that it will not interfere with the longitudinal movement of the plunger 120.

Starting from the unlocking position shown in FIGS. 16A to 16F, the locking device 100 may transition to the locking position as shown in FIGS. 17A to 18F through the user's operate.

Specifically, the user presses the plunger 120 towards the second axial position (i.e., to the right in FIGS. 16E and 16F), for example pressing the plunger 120 through the bolt 200. The plunger 120 moves towards the second axial position against the bias pressure of the compression spring 182, and at the same time, due to the interaction between the guide groove 125 and the guide 181, the plunger 120 rotates towards the second rotational position guided by the guide 181. As a result, the irregular groove 124 rotates to face the elastic needle 183, so that the elastic needle 183 is inserted into the irregular groove 124 and can maintain the plunger 120 in the second axial position.

Then, the motor 140 drives the rotor 160 to rotate, for example, according to a preset circuit, so that the rotor edge 162 is engaged with the guide groove engage segment 125*c*, and therefore the locking device 100 transits to the locking position shown in FIGS. 17A to 18F.

As mentioned above, although the elastic needle 183 can hold the plunger 120 in the locking position, in order to prevent accidental opening of the locking device 100, the rotor 160 serves to stabilize the plunger 120 in the locking position. In this way, during the driving process of the car or when the owner leaves the car, even if the charging door or fuel tank cap is subjected to external pressure or vibration, the locking device 100 will not disengage from the locking position, so it is not allowed to open the charging door or fuel tank cap.

As shown in FIG. 18A, the second rotational position is the position where the insertion groove 126 of the plunger 120 is at an angle to the bolt head 210 of the bolt 200. When the plunger 120 is in the second rotational position, the bolt 200 is locked in the insertion groove 126 of the plunger 120, thereby locking the charging door or fuel tank cap to the locking device 100.

As shown in FIG. 18F, when the plunger 120 is in the locking position, the elastic needle 183 moves into the irregular groove 124, thus interfering with the movement of the plunger 120. More specifically, when the plunger 120 is pressed to the second axial position and slightly rebounds, the elastic needle 183 moves along the locking trajectory 127 (FIG. 5) to the concave portion of the irregular groove 124 and rests at the concave portion to prevent further rebound of the plunger 120. It is necessary to press the plunger 120 again to move the elastic needle 183 out of the irregular groove 124 along the unlocking trajectory 128 (FIG. 5), allowing the plunger 120 to rebound to the unlocking position.

Specifically, as shown in FIGS. 16B to 16D, when the plunger 120 reaches the locking position, the guide groove 125 is already facing the rotor 160. Therefore, the motor 140 can drive the rotor 160 to rotate to the engaged position, causing the rotor edge 162 to abut against the guide groove engage segment 125*c* to prevent the rotation and/or axial movement of the plunger 120. As mentioned above, the axial movement and rotation of the plunger 120 are synchronous, so that the abutting type between the rotor edge 162 and the guide groove engage segment 125*c* can be set to prevent the axial movement, rotation, or both of plunger 120, both of which can keep the plunger 120 in the locking position.

When the rotor 160 is in the engaged position, the buffer 184 abuts against another engagement portion 163 to prevent excessive rotation of the rotor 160.

Starting from the locking position, when the user needs to unlock the locking device 100, driving the rotor 160 to rotate to a disengaged position through the motor 140 firstly. Then, press the plunger 120 towards the second axial position, causing the elastic needle 183 to leave the irregular groove 124 along the unlocking trajectory 128. Then, the plunger 120 is biased towards the first axial position by the compression spring 182, and meanwhile under the action of the guide 181, the plunger 120 rotates to the first rotational position and finally reaches the unlocking position.

Referring to FIGS. 19 to 20, the locking device 100 in the unlocking and locking positions, as well as the bolt 200 not inserted into the locking device 100, are shown respectively.

The bolt head 210 has an approximate H-shaped configuration, and the first end 121 of the plunger 120 has a matching H-shaped inlet (i.e., insertion groove 126) for the bolt head 210 to insert, and a cylindrical space is formed on the inner side of the H-shaped inlet away from the first end 121 for the bolt head 210 to rotate freely. Therefore, the bolt head 210, after being inserted into the H-shaped inlet, through rotating at an angle along with the plunger 120, can be stopped by the H-shaped inlet and locked to the first end 121.

It should be understood that the bolt head 210 and the insertion groove 126 can also be formed into other shapes, as long as the bolt head 210 can longitudinally insert or detach from the first end 121 of the plunger 120 when the plunger 120 is in the unlocking position, and lock to the first end 121 when the plunger 120 moves from the unlocking position to the locking position.

Although preferred embodiments have been shown and described herein, it should be understood that these embodiments are only provided as examples. The person skilled in the art would think of many variants, changes, and replacements without departing from the spirit of the present invention. Therefore, the accompanying claims aim to cover all such variations falling within the spirit and scope of the present invention.

What is claimed is:

1. A locking device (100) comprising:
   a housing (110);
   a plunger (120) inserted into the housing (110), movable in a longitudinal direction relative to the housing (110) and rotatable around the longitudinal direction to transit between a locking position and an unlocking position, wherein when the plunger (120) is in the unlocking position, the plunger (120) is in a first rotating position and a first axial position, when the plunger (120) is in the locking position, the plunger (120) is in a second rotational position different from the first rotational position and a second axial position different from the first axial position, a guide groove (125) is arranged on an outer peripheral surface of the plunger (120), the guide groove (125) including a guide groove engage segment (125*c*);
   a rotor (160) accommodated in the housing (110) and rotatable around a rotor rotation axis (169) relative to the plunger (120) between an engaged position and a disengaged position, wherein when the plunger (120) is in the locking position, the rotor (160) is rotatable to the engaged position to prevent the plunger (120) from moving; and
   a motor (140) accommodated in the housing (110) and configured to drive the rotor (160) to rotate;
   a guide (181) located near an open end of the housing (110), and the guide (181) extends from an inner surface of the housing (110) to abut the guide groove (125) and move relative to the guide groove (125), causing the plunger (120) to be forced to rotate to the first rotational position when the plunger (120) moves to the first axial position, and be forced to rotate to the second rotational position when the plunger (120) moves to the second axial position; and
   the guide groove engage segment (125*c*) is set so that when the plunger (120) is in the locking position and the rotor (160) is in the engaged position, a rotor edge (162) of the rotor (160) is engaged with the guide groove engage segment (125*c*) to prevent a longitudinal movement of the plunger (120), and the guide groove (125) is set to avoid mutual interaction between the plunger (120) and the rotor (160) when the rotor (160) is in the disengaged position.

2. The locking device (100) according to claim 1, wherein:
   the housing (110) includes the open end (116) and a closed end (117) that are opposite in the longitudinal direction;
   the plunger (120) comprises:
   a first end (121) facing the open end (116);
   a second end (122) opposite to the first end (121), the plunger (120) being installed into the housing (110)

from the open end (116) of the housing (110) towards the closed end (117) through the second end (122);

wherein the guide groove (125) extends along the longitudinal direction towards a middle of the plunger (120) near the first end (121).

3. The locking device (100) according to claim 2, wherein:

the guide groove (125) includes a guide groove linear segment (125a) and a guide groove spiral segment (125b) connected to each other longitudinally, the guide groove linear segment (125a) extends longitudinally in a straight line from a position close to the first end (121), and the guide groove spiral segment (125b) extends at an angle from the end of the guide groove linear segment (125a), spirally away from the first end (121) along the outer circumference of the plunger (120).

4. The locking device (100) according to claim 3, wherein:

a cross section of the guide (181) perpendicular to the longitudinal direction matches a cross section area of the guide groove (125) perpendicular to the longitudinal direction, and includes a first guide edge (181a) and a second guide edge (181b), both of which are roughly perpendicular to the longitudinal direction and form an angle with each other, and are respectively against two inner sides of the guide groove spiral segment (125b) of the guide groove (125), to force the plunger (120) to rotate when the plunger (120) moves.

5. The locking device (100) according to claim 4, wherein:

the rotor rotation axis (169) of the rotor (160) is parallel to a plunger spin axis (129) of the plunger (120);

the guide groove engage segment (125c) is extended basically circumferentially along a spiral direction of the guide groove spiral segment (125b) from the end of the guide groove spiral segment (125b).

6. The locking device (100) according to claim 5, wherein the rotor edge (162) of the rotor (160) includes an actuated part with internal teeth (164), and a driving gear (142) of the motor (140) is engaged with the internal teeth (164) to drive the rotor (160) to rotate between the engaged position and the disengaged position;

wherein, the actuated part includes a engagement section (162a) and a driving section (162b), and an extension length of the engagement section (162a) along the longitudinal direction matches a groove width of the guide groove engage segment (125c) along the longitudinal direction, so that the engagement section (162a) can rotate into the guide groove engage segment (125c), and the driving section (162b) is connected to the engagement section (162a), and a step is formed at the junction of the driving section (162b) and the engagement section (162a), the step prevents the driving section (162b) from further rotating into the guide groove engage segment (125c).

7. The locking device (100) according to claim 6, wherein:

the locking device (100) further includes a housing cover (170) installed on the open end (116) of the housing (110), and a buffer (184) is installed on an inner side of the housing cover (170) facing the open end (116);

the rotor (160) is provided with two engagement portions (163) located substantially in the same longitudinal position as the buffer (184), and the buffer (184) is located between the two engagement portions (163), thereby controlling the rotor (160) to swing around the rotor rotation axis (169).

8. The locking device (100) according to claim 2, wherein:

the plunger (120) includes a trajectory groove (123) arranged on the outer peripheral surface of the plunger (120), extended longitudinally towards the middle of the plunger (120) from vicinity of the second end (122), staggered with the guide groove (125) in a circumferential direction;

the trajectory groove (123) includes a trajectory groove linear segment (123a) and a trajectory groove spiral segment (123b) connected to each other in a longitudinal direction, the trajectory groove linear segment (123a) extends in a straight line in a longitudinal direction from a position close to the second end (122), and the trajectory groove spiral segment (123b) starts from an end of the trajectory groove linear segment (123a), and extends at an angle spirally along the outer circumference of the plunger (120) away from the second end (122), and a spiral direction of the trajectory groove spiral segment (123b) is the same as the spiral direction of the guide groove spiral segment (125b).

9. The locking device (100) according to claim 8, wherein:

the plunger (120) further includes an irregular groove (124) formed at an end of the trajectory groove spiral segment (123b) of the trajectory groove (123) away from the second end (122), and defining a closed loop groove on the outer peripheral surface of the plunger (120);

the locking device (100) further includes an elastic needle (183), a fixed end (183a) of the elastic needle (183) is fixed to the housing (110), a free end (183b) of the elastic needle (183) is inserted into the trajectory groove (123) or the irregular groove (124) and movable along the trajectory groove (123) and the irregular groove (124) to limit the plunger (120) in the locking position.

10. The locking device (100) according to claim 9, wherein:

the shape of the irregular groove (124) is designed so that the free end (183b) of the elastic needle (183) travels in a one-way cycle in the irregular groove (124), and does not travel in an opposite direction.

11. The locking device (100) according to claim 10, wherein:

a tip of the irregular groove (124) faces the second end (122), and a concave portion of the irregular groove (124) is opposite to the tip and away from the second end (122);

when the plunger (120) is in the unlocking position, the free end (183b) of the elastic needle (183) is located in the trajectory groove (123), when the plunger (120) is in the locking position, the free end (183b) of the elastic needle (183) is located in the concave portion.

12. The locking device (100) according to claim 2, wherein:

the first axial position is the position where the first end (121) of the plunger (120) is away from the closed end (117) of the housing (110), and the second axial position is the position where the first end (121) of the plunger (120) is near to the closed end (117) of the housing (110).

13. The locking device (100) according to claim 12, wherein the locking device (100) further comprising:

a seal (130) in the shape of a corrugated tube, the seal (130) is sleeved on the plunger (120), one end of the seal (130) is fixed with the first end (121) of the plunger (120), and another end of the seal (130) is fixed to a flange formed jointly by an upper flange portion (114) of the housing (110) and a lower flange portion (174) of a housing cover (170);

the seal (130) has a corrugated portion (131) that can be extended or folded, and is extended or folded as the plunger (120) moves between the locking position and the unlocking position.

14. The locking device (100) according to claim 1, wherein the locking device (100) further comprising:

a compression spring (182), one end of which fixed to the housing (110), and the other end of the compression spring (182) presses against the plunger (120) to bias the plunger (120) towards the first axial position.

15. The locking device (100) according to claim 1, wherein:

the plunger (120) is accommodated in a first accommodating chamber (111) of the housing, the motor (140) and the rotor (160) are accommodated in a second accommodating chamber (112) of the housing, and the first accommodating chamber (111) and the second accommodating chamber (112) are extended along the longitudinal direction respectively and arranged adjacent in a lateral direction which is perpendicular to the longitudinal direction.

16. A locking system, wherein the locking system comprising:

the locking device (100) according to claim 1; and a bolt (200) having a bolt head, and the bolt head is longitudinally insertable or detachable from a first end (121) of the plunger (120) when the plunger (120) is in the unlocking position, and locked to the first end (121) when the plunger (120) moves from the unlocking position to the locking position.

17. The locking system according to claim 16, wherein the bolt head is in an approximately H-shaped configuration, and the first end (121) of the plunger (120) has a matching approximately H-shaped inlet for bolt head to insert, and a cylindrical space for the bolt head to rotate freely is formed on the inner side of the approximately H-shaped inlet away from the first end (121), so that the bolt head, after being inserted into the approximately H-shaped inlet, through rotating at an angle along with the plunger (120), can be stopped by the approximately H-shaped inlet and locked to the first end (121).

* * * * *